(12) United States Patent
Cline et al.

(10) Patent No.: US 7,523,327 B2
(45) Date of Patent: Apr. 21, 2009

(54) SYSTEM AND METHOD OF COHERENT DATA TRANSFER DURING PROCESSOR IDLE STATES

(75) Inventors: Leslie E. Cline, Sunnyvale, CA (US); Siripong Sritanyaratana, Union City, CA (US); Alon Naveh, Ramat Hasharon (IL); Shai Rotem, Haifa (IL); Eric C. Samson, Folsom, CA (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 11/074,233

(22) Filed: Mar. 5, 2005

(65) Prior Publication Data

US 2006/0200690 A1 Sep. 7, 2006

(51) Int. Cl.
*G06F 1/32* (2006.01)
(52) U.S. Cl. .................. 713/320; 713/324; 713/600
(58) Field of Classification Search ......... 713/300–375, 713/600, 601
See application file for complete search history.

(56) References Cited

U.S. PATENT DOCUMENTS

| 6,560,712 | B1 * | 5/2003 | Arends et al. ............... 713/320 |
| 6,748,548 | B2 | 6/2004 | Bormann et al. |
| 6,795,896 | B1 | 9/2004 | Hart et al. |
| 6,802,018 | B2 | 10/2004 | Bormann et al. |
| 6,971,034 | B2 | 11/2005 | Samson et al. |
| 6,976,181 | B2 | 12/2005 | Dai et al. |
| 2002/0116554 | A1 * | 8/2002 | Bormann et al. ............... 710/15 |
| 2002/0124125 | A1 * | 9/2002 | Bormann et al. ............. 710/110 |
| 2002/0124198 | A1 * | 9/2002 | Bormann et al. ............. 713/323 |
| 2005/0044448 | A1 * | 2/2005 | Verdun ........................ 714/22 |
| 2006/0020835 | A1 | 1/2006 | Samson et al. |

OTHER PUBLICATIONS

U.S. Appl. No. 11/323,254; Title: Method and Apparatus for a Zero Voltage Processor Sleep State; Inventor: Sanjeev Jahagirdar et al.; filed Dec. 30, 2005.
U.S. Appl. No. 11/300,716; Title: Method and Apparatus for Enabling a Low Power Mode for a Processor; Inventor: Xia Dai et al.; filed Dec. 13, 2005.
International Application No. PCT/US2006/005324, PCT International Search Report, 1-9.

* cited by examiner

*Primary Examiner*—Thomas Lee
*Assistant Examiner*—Paul B Yanchus, III
(74) *Attorney, Agent, or Firm*—Blakely, Sokoloff, Taylor & Zafman LLP

(57) ABSTRACT

Systems and methods of managing power provide for placing a processor in a non-snoopable state, where the processor is associated with a system memory. One or more data transfers between a controller and the system memory can be serviced while the processor is in the non-snoopable state. In one embodiment, it is determined that the processor has flushed an internal cache of the processor to the system memory before placing the processor in the non-snoopable state.

19 Claims, 3 Drawing Sheets

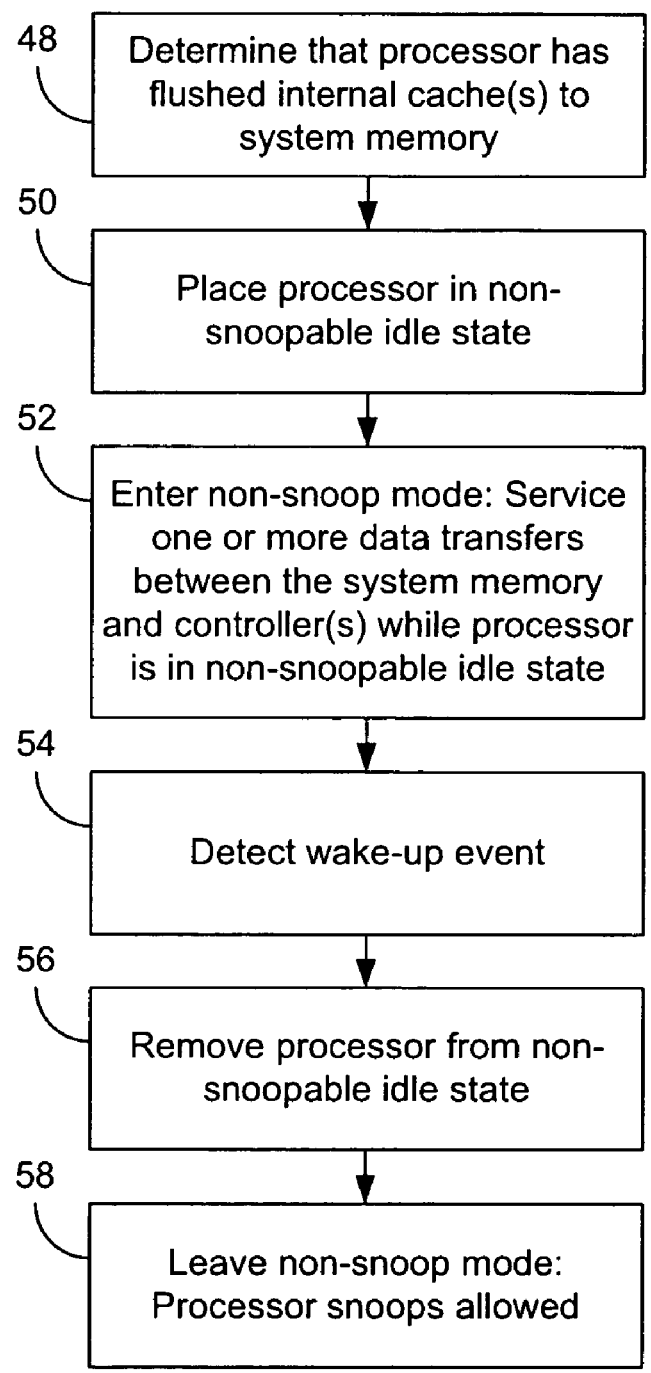

SYSTEM AND METHOD OF COHERENT DATA TRANSFER DURING PROCESSOR IDLE STATES

CROSS-REFERENCE TO RELATED APPLICATIONS

The present application is related to U.S. patent application Ser. No. 11/024,538, filed on Dec. 28, 2004.

BACKGROUND

1. Technical Field

One or more embodiments of the present invention generally relate to power management. In particular, certain embodiments relate to managing power in computing systems.

2. Discussion

As the trend toward advanced central processing units (CPUs) with more transistors and higher frequencies continues to grow, computer designers and manufacturers are often faced with corresponding increases in power and energy consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life.

Because batteries typically have a limited capacity, running the processor of a mobile computing system more than necessary could drain the capacity more quickly than desired. Some modern mobile computing systems therefore attempt to conserve power by placing the processor in various low power/idle states when there are no instructions to be executed. As the low power states become deeper and deeper, more functionality within the processor is often lost. For example, one ultra low power state involves reducing the core voltage so low that there may be concern over data loss in the internal cache(s) of the processor. Therefore, when a processor is in this state, the internal caches of the processor may be flushed to system memory and snoops to the cache can be ignored and/or disallowed. While use of such a deep low power state can provide significant power savings, data transfers between various controllers and the system memory typically require snoops to the processor internal cache. As a result, the processor may be forced out of the low power state more often than desired.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a flowchart of an example of a method of power management according to one embodiment of the invention.

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Figure 1:
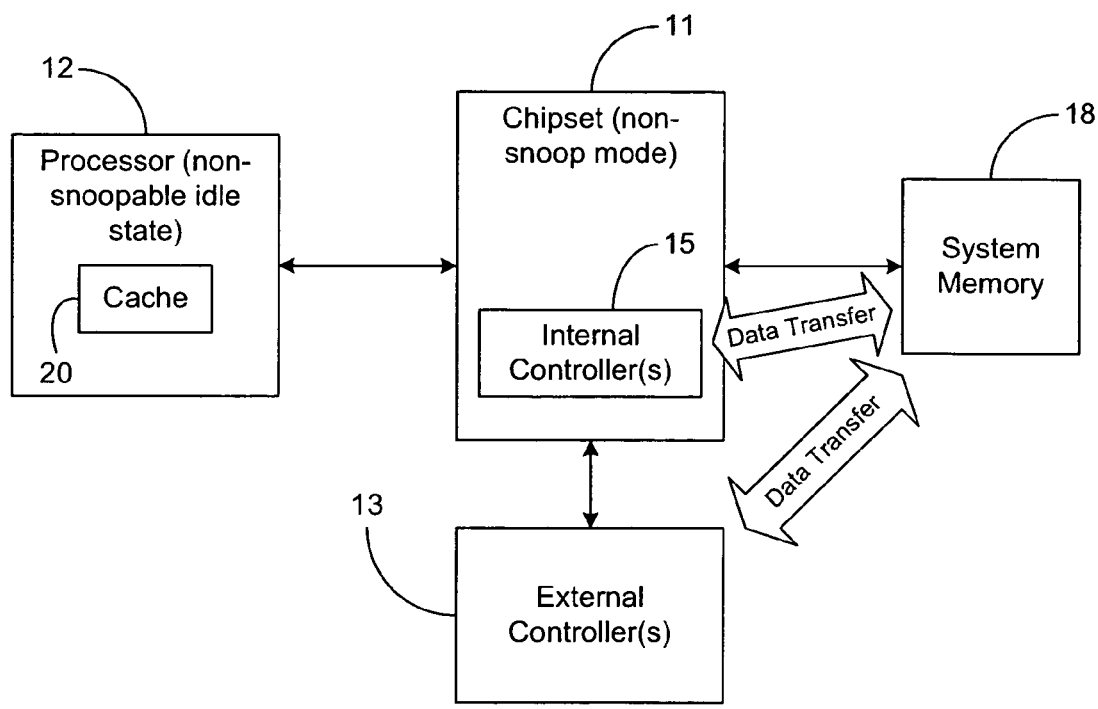
FIG. 1 is a block diagram of an example of an apparatus according to one embodiment of the invention.

FIG. 1 shows a device having a system memory 18, one or more external controllers 13, a processor 12 with a cache 20, and a chipset 11 with one or more internal controllers 15. Generally, the chipset 11 manages data transfers between the various components of the device. The processor 12 is able to enter one or more active and/or idle states based on performance and/or power management concerns. In the illustrated example, the processor 12 is in a non-snoopable idle state and the chipset 11 supports data transfers between the controllers 13, 15 and the system memory 18 while the processor 12 is in the non-snoopable idle state. The non-snoopable idle state can enable the processor 12 achieve reduced leakage current and power consumption, where the term "non-snoopable" is used herein to refer to a condition in which a component having a cache does not support cache coherence in that state. Cache coherence is essentially a protocol for managing the caches of a system so that no data is lost or overwritten before the data is transferred from a cache to the target memory. In a snooping-based cache coherence system, all caches on the bus can have a mechanism to monitor (or snoop) the bus to determine if they have a copy of the block of data that is requested on the bus. Under typical circumstances, the chipset 11 would monitor all data transfers to and from the system memory 18 on behalf of the processor 12. When the illustrated processor 12 is in the non-snoopable idle state, however, such monitoring does not take place. By continuing to service data transfers between the controllers 13, 15 and the system memory 18 while the processor 12 is in the non-snoopable idle state, the chipset 11 enables greater power savings than achievable under conventional approaches.

Figure 2:
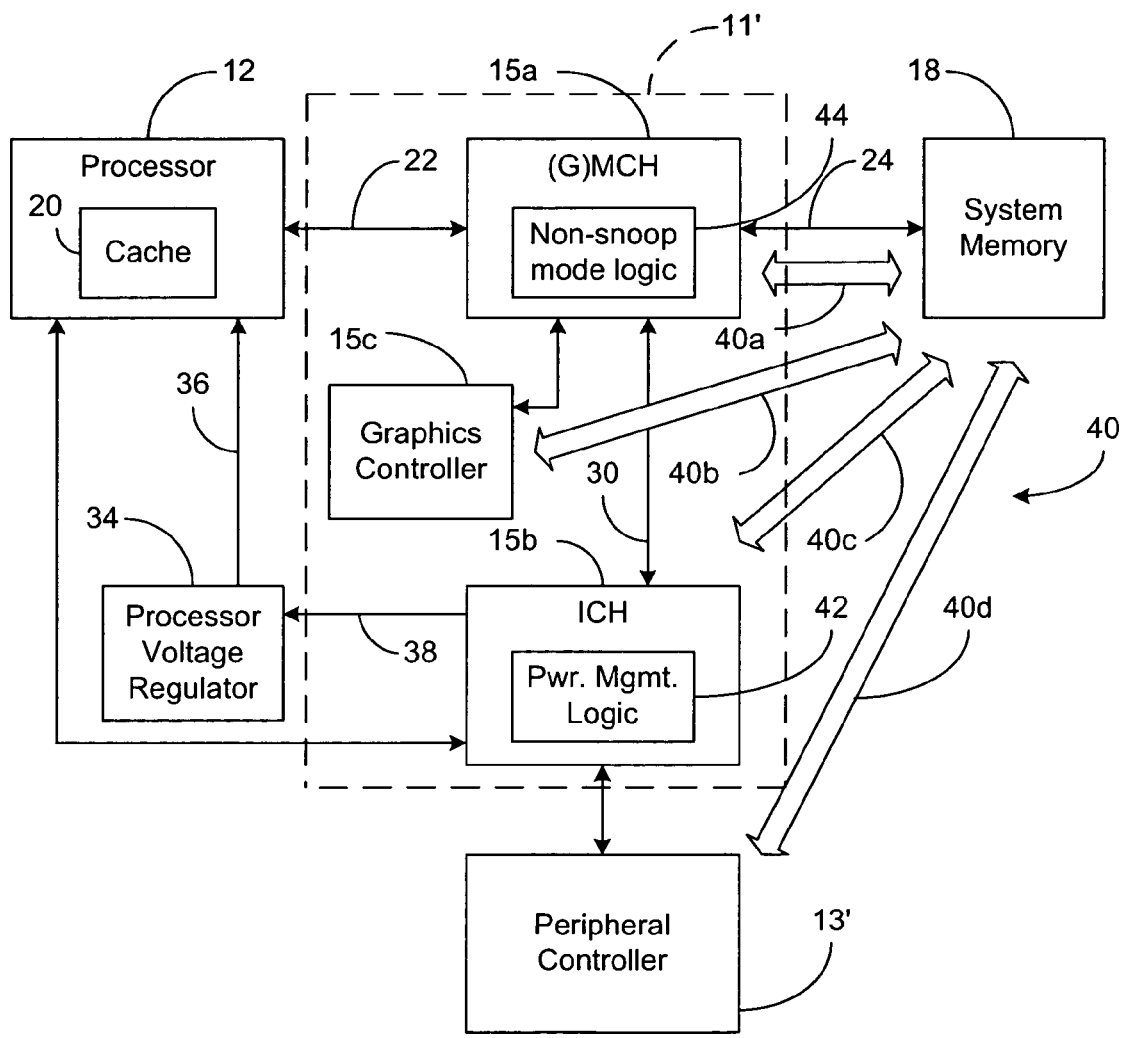
FIG. 2 is a block diagram of an example of a system according to one embodiment of the invention.

Turning now to FIG. 2, a system 10 having a processor 12, a system memory 18, and a chipset 11' that includes a graphics memory controller hub ((G)MCH) 15a, an input/output controller hub (ICH) 15b and a graphics controller 15c, is shown. The system 10 could be part of a computing system such as a server, desktop personal computer (PC), notebook PC, personal digital assistant (PDA), wireless "smart" phone, and so on. The processor 12 could be similar to a Pentium® M processor available from Intel Corporation in Santa Clara, Calif., and is shown as having an internal cache 20 such as a level one (L1), level two (L2), trace, data and/or instruction cache. In one example, the cache 20 includes high-speed static RAM (SRAM), whereas the system memory 18 includes slower dynamic RAM (DRAM). The DRAM modules of the system memory 18 may also be incorporated in to a single inline memory module (SIMM), dual inline memory module (DIMM), small outline DIMM (SODIMM), and so on.

The illustrated processor 12 is able to execute program code/instructions and can also include instruction fetch units, instruction decoders, execution units, and so on (not shown). The processor 12 can also be associated with a voltage regulator 34 that establishes a core voltage 36 for the processor 12. As will be described in more detail, the voltage regulator 34 may reduce the core voltage 36 of the processor 12 to a level below a data retention threshold of the cache 20 in response to a power state control signal 38 from the ICH 15b.

The illustrated processor 12 can communicate with the MCH 15a over an interface such as a front side bus (FSB) 22, where the MCH 15a is sometimes referred to as a Northbridge. The MCH 15a can communicate with the system memory 18 via a memory bus 24 and with the graphics controller 15c via a graphics bus 28 such as a PCI Express Graphics (PEG, e.g., Peripheral Components Interconnect/PCI Express x16 Graphics 150W-ATX Specification 1.0, PCI Special Interest Group) bus or an Accelerated Graphics Port (e.g., AGP V3.0 Interface Specification, September 2002, Intel® Corporation) bus. The MCH 15a may also communicate with the ICH 15b, which may be referred to as a Southbridge, over a hub bus 30. In one embodiment, the hub bus 30 is a DMI (Direct Media Interface) bus. The illustrated system 10 also has one or more peripheral controllers 13' such as a Wi-Fi (e.g., IEEE 802.11a, b, g) network interface, an Ethernet controller (e.g., IEEE 802.3), PC Card controller (e.g., CardBus PCMCIA standard), and so on. Thus, the system 10 may include chipset internal controllers such as the MCH 15a, graphics controller 15b and ICH 15c, and external controllers such as the peripheral controller 13'. The ICH 15c may also have internal controllers such as USB (Universal Serial Bus, e.g., USB Specification 2.0, USB Implementers Forum), Serial ATA (SATA, e.g., SATA 1.0a Specification, Feb. 4, 2004, SATA International Organization/SATA-IO), High Definition Audio, and other controllers.

As already noted, the illustrated ICH 15b is able to place the processor 12 in one or more low power states to reduce power consumption by issuing various power state control signals 38 to the voltage regulator 34. Alternatively, the processor 12 could place itself in the various low power states and inform the chipset 11' of its low power state status. The low power states could be established in accordance with the Advanced Configuration and Power Interface Specification (ACPI Specification, Rev. 3, Sep. 2, 2004), where processor power states (Cx states) are processor power consumption and thermal management states within a global working state. Although certain embodiments may be described with reference to ACPI Cx states being used as low power states, the embodiments of the invention are not so limited. Indeed, the principles described herein can be useful in any cache coherent environment in which power consumption is an issue of concern. Notwithstanding, there are a number of embodiments for which ACPI Cx states are well suited.

In general, as the processor 12 enters deeper and deeper low power states, additional power saving measures can be taken to decrease leakage current and/or power consumption, where entry to and exit from the states may take longer and longer. In particular, low power states such as the Cx states may possess specific entry and exit semantics and associated latencies. For example, while the processor 12 is in the C0 state, it executes instructions, and while the processor 12 is in the C1 state, it is idle and typically has the lowest entry/exit latency. The hardware latency in the C1 state is generally low enough that the operating system (OS) software does not consider the latency aspect of the state when deciding whether to use it. Aside from placing the processor 12 in a non-executing power state, the C1 state may have no other software-visible effects. Hardware aspects of the C1 state may involve the gating of one or more unused clock signals to save power. Another processor power state is the C2 state, which can offer improved power savings over the C1 state. The worst-case hardware latency for the C2 state can be provided via the ACPI system firmware, and the operating software can use this information to determine when the C1 state should be used instead of the C2 state. Aside from placing the processor 12 in a non-executing power state, this state may have no other software-visible effects. Hardware aspects of the C2 state may involve the gating of additional clocks.

The processor 12 could also be placed in the C3 state, which can offer improved power savings over the C1 and C2 states. The worst-case hardware latency for this state may also be provided via the ACPI system firmware, where the OS software can use this information to determine when the C2 state should be used instead of the C3 state. While in the C3 state, certain clocks may be shut down and the core voltage 36 may be reduced to a level low enough to conserve more power but high enough for processor's caches 20 to maintain state. In this state, the caches 20 may ignore any snoops. The caches 20 may also be flushed out to the system memory according to the cache coherence policy associated with the C3 state.

Other deeper power states could include a C4 state, in which the core voltage 36 of the processor 12 can be reduced to below the lowest operating point by approximately 100-200 mV. In addition, an even deeper C5 state could be used to instruct the processor 12 to save an operating context for itself. Once the operating context for processor 12 has been saved, the core voltage 36 can be reduced to a level below a context retention point for the processor 12. The context retention point may be, for example, an operating level where the operating context for processor 12 may potentially be partially or fully lost. In each of the C3 and deeper states, the processor 12 could be said to be in a non-snoopable state because snoops to the cache 20 are not permitted. As already noted, cache snooping is a process wherein accesses (i.e., reads/writes) to the system memory 18 by controllers such as the MCH 15a, graphics controller 15c, ICH 15b and peripheral controller 13', are used to determine whether data in the cache 20 is valid. Under conventional approaches, these accesses, illustrated by data paths 40 (40a-40d), respectively, require that the processor 12 be placed in a snoopable state (e.g., C2 or shallower).

In the illustrated example, however, data can be moved over paths 40 while the processor is in a non-snoopable idle state such as processor power states C3 or deeper. In particular, the illustrated ICH 15b includes power management logic 42 to place the processor 12 in the non-snoopable idle state and the MCH 15a includes non-snoop mode logic 44 to service data transfers between the system memory 18 and the system controllers while the processor 12 is in the non-snoopable idle state. Although the power management logic 42 and the non-snoop mode logic 44 are illustrated as being located on the ICH 15b and MCH 15a, respectively, the power management logic 42 and the non-snoop mode logic 44 may be co-located or distributed elsewhere in the system 10 without parting from the spirit and scope of the embodiments described herein. For example, the power management logic 42 could be disposed within the processor 12, so that the processor is able to manage its own power state transitions.

The chipset-external peripheral controller 13' could include a Wi-Fi controller that issues a bus master request to write data to (or read data from) a cacheable portion of the system memory 18 while the processor 12 is in the ultra low power C5 state. In such a case, the non-snoop mode logic 44 can service the request associated with data path 40d without the need to bring the processor 12 out of the C5 state. Similarly, the chipset-internal graphics controller 26 may issue a bus master request to write data to (or read data from) a cacheable portion of the system memory 18 over data path 40b. Once again, the data transfer can be serviced without bringing the processor 12 out of the ultra low power state. In addition, the MCH 15a could transfer data across data path 40a and the ICH 15b could transfer data across data path 40c without disturbing the idle state of the processor 12. As a result of the ability of the processor 12 to remain in deeper idle states for longer periods of time, leakage current and overall power consumption can be reduced significantly.

Before placing the processor 12 in the non-snoopable idle state, the power management logic 42 may determine that the processor 12 has flushed the cache 20 to the system memory 18 by detecting a specific request. For example, the processor 12 could issue an input/output (I/O) request to read from a particular register (e.g., LVL5 register, not shown) within the ICH 15b. Upon receiving such a read request, the power management logic 42 could initiate a transition of the processor 12 to the non-snoopable idle state.

In addition, the power management logic 42 could detect a wake-up event such as an unmasked system interrupt request and remove the processor 12 from the non-snoopable idle state in response to detecting the wake-up event. Unmasked system interrupt requests can be internal or external with respect to the chipset 11', depending upon the circumstances. Once the processor 12 has exited the non-snoopable idle state, the chipset 11' may exit the non-snoop mode and resume cache coherence operations with regard to the cache 20.

Turning now to FIG. 3 a method of power management is shown at 46. The method 46 may be implemented as non-snoop mode logic and/or power management logic in fixed functionality hardware, microcode, software, or any combination thereof. For example, a particular hardware implementation might involve the use of complementary metal oxide semiconductor (CMOS) technology, which is well established in the semiconductor industry. In particular, processing block 48 provides for determining that a processor has flushed an internal cache of the processor to a cacheable system memory. As already noted, one approach to making the determination at block 48 is to detect a specific I/O read request from the processor.

Block 50 provides for placing the processor in a non-snoopable idle state such as a C3 or deeper power state. One or more data transfers are serviced between the cacheable system memory and a controller at block 52 while the processor is in the non-snoopable idle state. In one embodiment, the servicing at block 52 is conducted by detecting a bus master request from the controller in question and moving data between the controller and the system memory based on the bus master request. Block 54 provides for detecting a wake-up event such as an unmasked system interrupt request, and block 56 provides for removing the processor from the non-snoopable idle state in response to detecting the wake-up event. One or more data transfer requests are handled in accordance with standard cache coherence protocol at block 58. Thus, snoops to the processor internal cache may be allowed.

Many of the principles described herein therefore provide for enhanced power savings, reduced temperatures and longer battery life by enabling a system microprocessor to remain in ultra low power states for longer periods of time. Such advantages represent a significant departure from conventional approaches and can be particularly beneficial in mobile platform environments.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method comprising:
   determining whether a processor has flushed an internal cache of the processor to a system memory prior to placing the processor in a non-snoopable idle state, wherein determining is performed by detecting a request;
   in response to the request, placing the processor in the non-snoopable idle state, the processor being associated with the system memory;
   servicing a data transfer between the system memory and a controller while the processor is in the non-snoopable idle state; and
   removing the processor from the non-snoopable idle state upon detecting a wake-up event.

2. The method of claim 1, wherein the request includes an input/output read request from the processor.

3. The method of claim 1, wherein the the wake-up event includes an unmasked system interrupt request.

4. The method of claim 1, wherein the servicing includes:
   detecting a bus master request from a memory controller hub; and
   moving data between the system memory and the memory controller hub based on the bus master request.

5. The method of claim 1, wherein the servicing includes:
   detecting a bus master request from a graphics controller; and
   moving data between the system memory and the graphics controller based on the bus master request.

6. The method of claim 1, wherein the servicing includes:
   detecting a bus master request from a peripheral controller; and
   moving data between the system memory and the peripheral controller based on the bus master request.

7. The method of claim 1, wherein the servicing includes:
   detecting a bus master request from an input/output controller hub; and
   moving data between the system memory and the input/output controller hub based on the bus master request.

8. An apparatus comprising:
   power management logic to determining whether a processor has flushed an internal cache of the processor to a system memory prior to placing the processor in a non-snoopable idle state, wherein determining is performed by detecting a request, and in response to the request, the power management logic to place the processor in the non-snoopable idle state, the processor associated with the system memory, wherein the power management logic is further to remove the processor from the non-snoopable idle state upon detecting a wake-up event; and
   non-snoop mode logic to service a data transfer between the system memory and a controller while the processor is in the non-snoopable idle state.

9. The apparatus of claim 8, wherein the request includes an input/output read request from the processor.

10. The apparatus of claim 8, wherein the wake-up event includes an unmasked system interrupt request.

11. The apparatus of claim 8, wherein the non-snoop mode logic is to service the data transfer by detecting a bus master request from the controller and moving data between the controller and the system memory based on the bus master request, the controller being selected from a group comprising a memory controller hub (MCH), a graphics controller, a peripheral controller and an input/output controller hub (ICH).

12. The apparatus of claim 8, wherein the power management logic is disposed within the processor.

13. The apparatus of claim 8, wherein the power management logic is disposed within an input/output controller hub (ICH).

14. The apparatus of claim 8, wherein the non-snoop mode logic is disposed within a memory controller hub (MCH)

15. A system comprising:
   a processor;
   a small outline dual inline memory module (SODIMM);
   an input/output controller hub (ICH) having power management logic to determining whether a processor has flushed an internal cache of the processor to a system memory prior to placing the processor in a non-snoopable idle state, wherein determining is performed by detecting a request, and in response to the request, the power management logic to place the processor in the non-snoopable idle state, the processor associated with the system memory, wherein the power management logic is further to remove the processor from the non-snoopable idle state upon detecting a wake-up event; and
   a memory controller hub (MCH) having non-snoop mode logic to service a data transfer between the SODIMM and a controller while the processor is in the non-snoopable idle state, and remove the processor from the non-snoopable idle state upon detecting a wake-up event.

16. The apparatus of claim 15, wherein the process includes an internal cache, the power management logic to determine that the processor has flushed the internal cache to the SODIMM before placing the processor in the non-snoopable idle state.

17. The system of claim 16, wherein the request includes an input/output read request from the processor.

18. The system of claim 17, wherein the wake-up event includes an unmasked system interrupt request.

19. The system of claim 15, wherein the non-snoop mode logic is to service the data transfer by detecting a bus master request from the controller and moving data between the controller and the system memory based on the bus master request, the controller being selected from a group comprising the MCH, a graphics controller, a peripheral controller and the ICH.

* * * * *